(12) United States Patent
Kishida et al.

(10) Patent No.: US 6,864,305 B2
(45) Date of Patent: Mar. 8, 2005

(54) PUNCTURE SEALING AGENT FOR A TIRE, AND PROCESS FOR PRODUCING THE SAME

(75) Inventors: Masahiro Kishida, Kobe (JP); Yoshihide Kojima, Kobe (JP); Kohei Takemura, Kobe (JP); Akihiko Hamada, Kobe (JP); Naoya Ichikawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 119 days.

(21) Appl. No.: 10/237,661

(22) Filed: Sep. 10, 2002

(65) Prior Publication Data

US 2003/0050365 A1 Mar. 13, 2003

(30) Foreign Application Priority Data

Sep. 11, 2001 (JP) .................................. 2001-275362
Dec. 27, 2001 (JP) .................................. 2001-397534

(51) Int. Cl.$^7$ .............................................. C08K 5/05
(52) U.S. Cl. ........................ 524/386; 524/387; 523/166
(58) Field of Search ................................. 524/386, 387; 523/166

(56) References Cited

U.S. PATENT DOCUMENTS 3,352,696 A    11/1967   Wallace
6,063,837 A *  5/2000    Kawamura et al. ......... 523/166

FOREIGN PATENT DOCUMENTS

EP    0 846 552 A2    6/1998

* cited by examiner

*Primary Examiner*—Kriellion A. Sanders
(74) *Attorney, Agent, or Firm*—Birch, Stewart, Kolasch & Birch, LLP

(57) ABSTRACT

A puncture sealing agent for a tire is at least comprising a rubber latex, an adhesive agent, and an antifreezing agent, wherein propylene glycol is used as the antifreezing agent, and further the ratio of the propylene-glycol to the total weight of the puncture sealing agent is set from 20 to 40% by weight.

7 Claims, 3 Drawing Sheets

IN STORAGE

IN USE

PUNCTURE SEALING AGENT FOR A TIRE, AND PROCESS FOR PRODUCING THE SAME

BACKGROUND OF THE INVENTION

1. Field of the Invention

The present invention relates to a puncture sealing agent for a tire, which is prevented from being transformed to a creamy material when being stored for a long term, so as to improve a long-term storability; and a process for producing the same.

2. Description of the Related Art

When a puncture is generated in a tire, a puncture sealing agent is frequently used. The sealing agent is an agent which is poured into the tire to seal up the punctured portion from the inside, thereby ensuring the airtightness of the tire.

As a puncture sealing agent of this type, there is known an agent wherein a rubber latex is blended at least with an adhesive agent and an antifreezing agent. As the antifreezing agent, ethylene glycol is generally adopted.

However, when a puncture sealing agent having such a composition is stored for a long term, rubber particles or adhesive agent particles therein aggregate near the surface so that the sealing agent trends to be transformed to a creamy material. As a result, as illustrated in FIGS. 3A and 3B, this creamy material a closes a taking-out mouth b1 of a container b. Thus, there is caused an inconvenience that an internal sealing agent c cannot be smoothly taken out.

It is presumed that the creamy material a is generated by the following mechanism: in the puncture sealing agent, which is a latex wherein rubber particles and adhesive agent particles are dispersed and floated in an aqueous ethylene glycol solution by ionic repulsive force between the particles and a surfactant, the gravity of the dispersed particles is smaller than that of the aqueous ethylene glycol solution, which is a medium; therefore, the respective rubber particles gradually rise up (float up) in the medium by the action of gravity and the rising particles form a particle-concentrated layer near the surface, whereby the puncture sealing agent is transformed to the creamy material.

Thus, the inventors suggested that instead of ethylene glycol, propylene glycol, which has a smaller gravity than ethylene glycol, was used as an antifreezing agent. According to this invention, the rubber particles come not to rise easily so as to make it possible to suppress the formation of the particle-concentrated layer near the surface.

However, in the case that a puncture sealing agent into which propylene glycol is incorporated at a high concentration is produced, the concentration of a rubber in the rubber latex is high and further propylene glycol is not easily mixed. Therefore, the poured propylene glycol irritates the rubber particles to induce aggregation. For example, a new problem that 5% or more of the whole of the rubber component is generated as aggregation lumps is caused.

SUMMARY OF THE INVENTION

In view of the above-mentioned situation, a first object of the present invention is to provide a puncture sealing agent wherein the use of propylene glycol as an antifreezing agent causes suppression of the phenomenon that rubber particles are concentrated nearby the surface and transformed to a creamy material when the agent is stored for a long term, so as changing to long-term storability.

A second object of the present invention is to provide a process for producing the above-mentioned puncture sealing agent for a tire, into which propylene glycol can be incorporated at a high concentration, with a high quality, the process being capable of suppressing the generation of aggregation lumps of rubber particles, resulting from propylene glycol, to a large extent.

In order to attain the first object, a first aspect of the present invention is a puncture sealing agent for a tire, comprising a rubber latex, an adhesive agent, and an antifreezing agent, wherein propylene glycol is used as the antifreezing agent, and further the ratio of the propylene glycol to the total weight of the puncture sealing agent is set to 20 to 40% by weight.

In order to attain the second object, a second aspect of the present invention is a process for producing the above-mentioned puncture sealing agent, comprising an adhesive agent pouring/mixing step of pouring/mixing the adhesive agent into/with the rubber latex under stirring to prepare an adhesive agent poured/mixed solution, and an antifreezing agent pouring/mixing step of pouring/mixing an aqueous propylene glycol solution wherein the propylene glycol is diluted with water into/with the adhesive agent poured/mixed solution under stirring.

DETAILED DESCRIPTION OF THE PREFERRED EXAMPLES

Figure 1A:
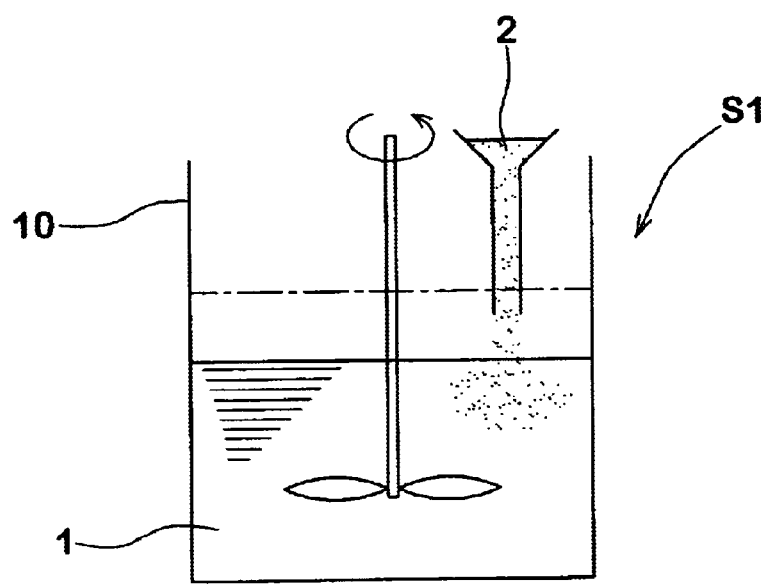
FIGS. 1A and 1B are views which conceptually illustrate an example of the process for producing a puncture sealing agent of the present invention.

Examples of the present invention will be described hereinafter.

The puncture sealing agent is a puncture sealing agent for a tire, comprising a rubber latex, an adhesive agent, and an antifreezing agent, wherein propylene glycol is used as the antifreezing agent, and further the ratio of the propylene glycol to the total weight of the puncture sealing agent is set to 20 to 40% by weight.

As the rubber latex used in the puncture sealing agent, a natural rubber latex having a high sealing ability is preferably used. The so-called deprotein natural rubber latex, which is a latex obtained by removing proteins from the natural rubber latex, is more preferably used since corrosion thereof can be suppressed because of a smaller amount of ammonia and corrosion and damage of a steel cord and generation of irritating odor, resulting from ammonia, are prevented. It is preferred to use, as the deprotein natural rubber latex, a latex wherein the nitrogen content, which is a conversion criterion of the protein content by percentage, is reduced to 0.1% or less by weight of rubber solid content. The protein content in ordinary natural rubber latexes is from about 0.2 to 0.3% by weight, as a value converted to the nitrogen content. The nitrogen content is a value obtained by measurement according to a Kjeldahl method.

If requested, it is allowable to use a latex wherein one part of a natural rubber latex is replaced by, for example, a synthetic rubber latex such as a styrene-butadiene rubber, an acrylonitrile-butadiene rubber, an ethylene-vinyl acetate rubber, a chloroprene rubber, a vinyl pyridine rubber, or a butyl rubber.

In order that the puncture sealing agent may quickly enter a puncture hole in a tire by running of the tire, close the puncture hole, and further keep sealing ability up to a certain measure of mileage, the ratio of the rubber latex to the total weight of the puncture sealing agent is set to 40 to 60% by weight. In this case, the ratio of the rubber solid content to the total weight of the puncture sealing agent is 25% or more by weight.

As the adhesive agent, any one selected from various resin adhesive agents which do not cause aggregation of the rubber latex can be used. For example, terpene resin, or phenol resin is preferably used. Other preferred examples of the resin adhesive agent include polyvinyl esters, polyvinyl alcohol and polyvinyl pyrrolidine.

This resin adhesive agent is used in order to heighten adhesion between the rubber latex and a tire to improve sealing ability, and the ratio thereof to the total weight of the puncture sealing agent is preferably from 10 to 30% by weight. If the ratio is less than 10% by weight, the adhesiveness of the puncture sealing agent is low so that the sealing ability and seal keeping ability are insufficient. On the other hand, if the ratio is more than 30% by weight, the latex content decreases relatively so that the sealing ability is lowered.

The antifreezing agent is used in order to make it possible that the puncture sealing agent is used without being frozen even in cold districts and to prevent a phenomenon that the puncture sealing agent is frozen during the storage thereof so that rubber particles therein aggregate. For the purpose thereof, ethylene glycol ($C_2H_6O_2$), which has a high antifreezing effect, is generally used.

In the present invention, however, propylene glycol ($C_3H_8O_2$) is used in order to suppress the generation of a creamy material near the surface of the puncture sealing agent when the agent is stored for a long term.

The effect of suppressing the generation of the creamy material is exhibited by the matter that the gravity of propylene glycol, which is 1.04, is lower than the gravity (1.12) of ethylene glycol, and is close to the gravity (0.92) of the rubber particles of the natural rubber or the gravity (0.95) of the particles of the adhesive agent.

Namely, the dispersed particles (the particles of the rubber particles and the adhesive agent) in the puncture sealing agent rise up (float up) since the gravity thereof is smaller than that of the aqueous solution of the antifreezing agent, which is a medium. The rising speed u of the dispersed particles at this time is represented by the following equation (1):

$$u = 2 \times r^2 \times (\rho - \rho o) \times g / (9 \times \eta) \quad (1)$$

wherein r represents the radius of the dispersed particles, $\rho$ represents the density of the dispersed particles, $\rho o$ represents the density of the medium, g represents the gravitational acceleration, and $\eta$ represents the viscosity of the medium.

About the densities $\rho o$ of media, the density of propylene glycol is smaller than that of ethylene glycol. Thus, about the difference of the density $\rho o$ of each of the media from the density $\rho$ of the dispersed particles (i.e., $\rho - \rho o$), the difference of propylene is also smaller than that of ethylene glycol. Therefore, about the rising speeds u obtained from the equation (1), the rising speed of propylene glycol is also smaller than that of ethylene glycol. For this reason, even when the puncture sealing agent is stored to stand still for a long term, the dispersed particles do not rise easily so that the formation of the particle-concentrated layer is suppressed near the surface. Thus, transformation to the creamy material can be suppressed.

Figure 2:
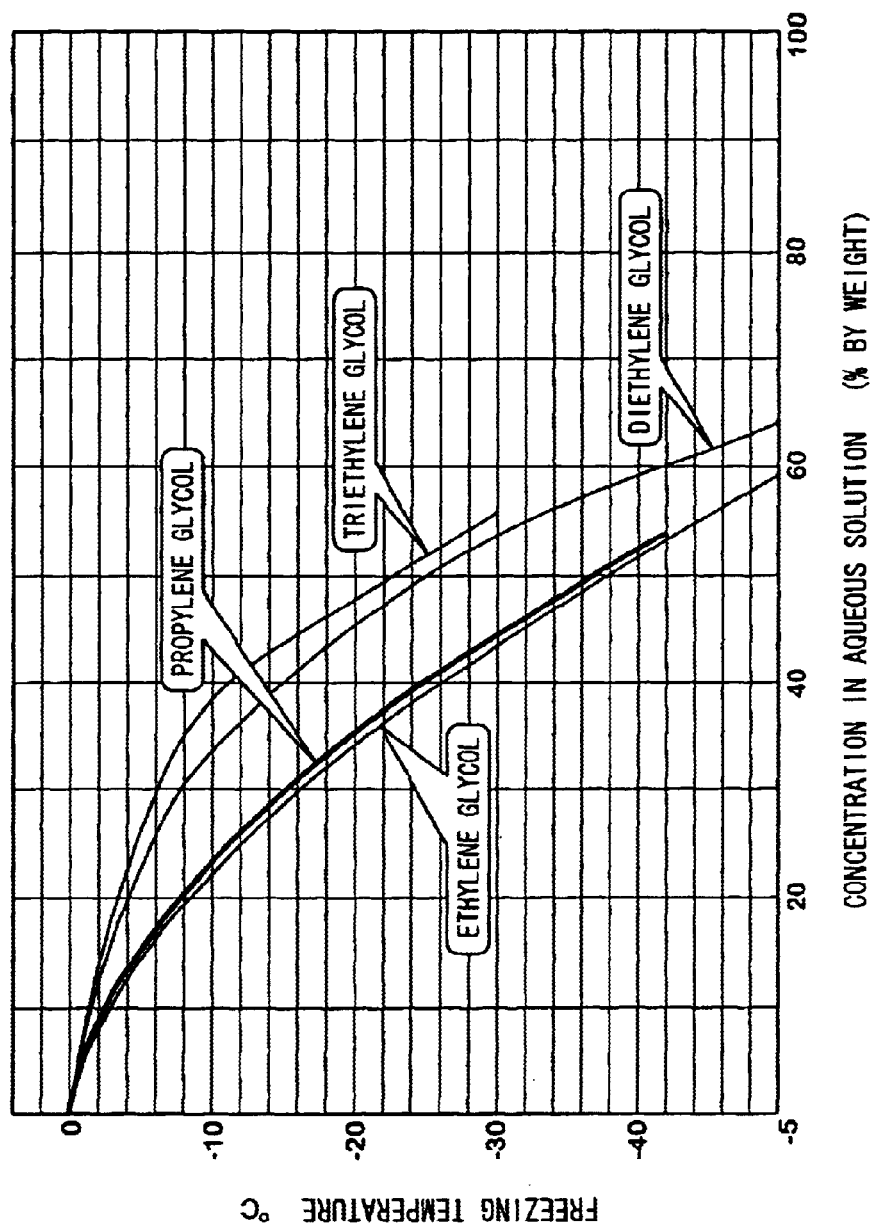
FIG. 2 is a graph showing relationship between concentrations of each of various glycols and freezing temperatures.
Figure 3A:
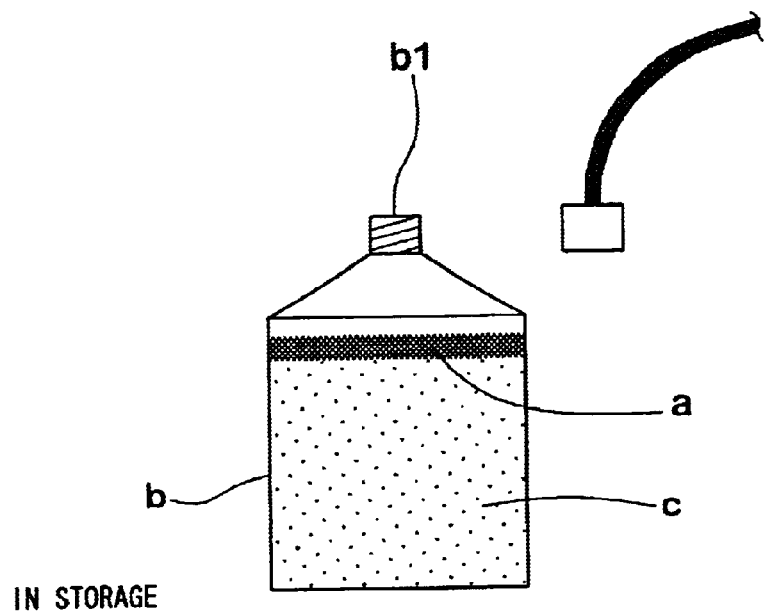
FIGS. 3A and 3B are views for explaining problems in the prior art.
Figure 3B:
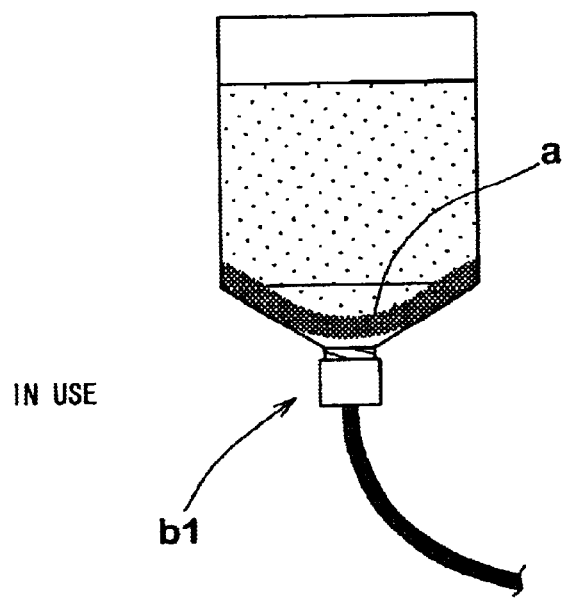

FIG. 2 shows relationship between concentrations of each of aqueous solutions of various glycols and freezing points thereof. As shown in FIG. 2, propylene glycol can exhibit superior antifreezing effect, which is equivalent to the antifreezing effect of ethylene glycol. Accordingly, while a desired antifreezing effect can be kept, the use amount of propylene glycol can be suppressed in the same way as in the case of ethylene glycol. Thus, adverse effects on various properties, such as sealing ability, by the antifreezing agent can be prevented.

The ratio of propylene glycol to the total weight of puncture sealing agent is from 20 to 40% by weight. If the ratio is less than 20% by weight, the puncture sealing agent is frozen so that the agent is unable to be used in cold districts, particularly in the case of low temperatures of −25° C. or less. On the other hand, if the ratio is more than 40% by weight, the latex content decreases relatively so that the sealing ability deteriorates.

A surfactant may be added, as a stabilizer, to the puncture sealing agent. As this surfactant, an anionic surfactant, an ampholytic surfactant, a special carboxylic acid type surfactant, or the like may be used. An aliphatic acid salt having 9 to 18 carbon atoms is particularly preferred since the salt exhibits the effect of suppressing coagulation in bulb cores without lowering the sealing ability.

Examples of the aliphatic acid in the aliphatic acid salt having 9 to 18 carbon atoms include capric acid having 10 carbon atoms, lauric acid having 12 carbon atoms, myristic acid having 14 carbon atoms, palmitic acid having 16 carbon atoms, and stearic acid, oleic aid, linolic acid and linoleic acid having 18 carbon atoms. Examples of the salt include sodium salt, potassium salt, ammonium salt and triethanolamine salt.

Among these examples, ammonium laurate and triethanolamine laurate are particularly preferred since they can exhibit superior coagulation-suppressing effect and have a characteristic of improving the coagulation-suppressing effect in proportion to the content thereof.

Ammonium laurate or triethanolamine laurate may be used in the state that it is mixed with a different surfactant. In this case, this different surfactant is preferably a surfactant made of an aliphatic acid salt having 9 to 18 carbon atoms. When ammonium laurate is produced, ammonia is necessary. Thus, ammonium laurate trends to give an ammonia odor. In view of odors, therefore, triethanolamine laurate is more preferably used.

The ratio of the surfactant to the total weight of the puncture sealing agent is from 0.4 to 2.0% by weight. If the ratio is less than 0.4% by weight, the stability of the puncture sealing agent becomes insufficient. As a result, the effect of suppressing the generation of the creamy material is damaged, or the agent trends to coagulate easily in bulb cores. On the other hand, if the ratio is more than 2.0% by weight, the sealing ability itself may deteriorate.

Figure 1B:
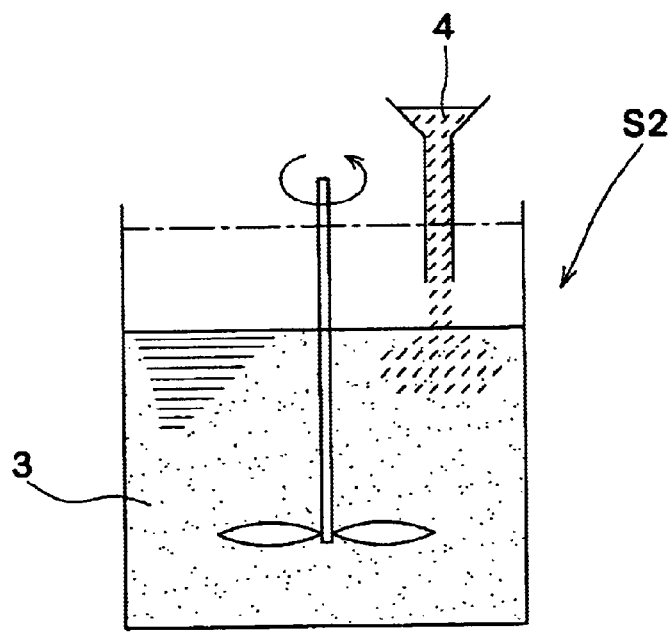

The following will describe a process for producing the puncture sealing agent. As conceptually shown in FIGS. 1A and 1B, the process for producing the puncture sealing agent comprises:

(I) an adhesive pouring/mixing step S1 of pouring/mixing an adhesive agent 2 into/with a rubber latex 1 under stirring to prepare an adhesive agent poured/mixed solution 3 (see FIG. 1A), and (II) an antifreezing agent pouring/mixing step S2 of pouring/mixing an aqueous propylene glycol solution 4 wherein propylene glycol is diluted with water into/with the adhesive agent poured/mixed solution 3 under stirring (see FIG. 1B).

Specifically, in the adhesive agent pouring/mixing step S1, the adhesive agent 2 is poured into the rubber latex 1 put in a tank 10 under stirring, to prepare the adhesive agent poured/mixed solution 3 wherein the rubber latex 1 is homogenously mixed with the adhesive agent 2.

In the antifreezing agent pouring/mixing step S2, a stock solution of propylene glycol (concentration: 100%) is not directly poured into the solution, but propylene glycol is diluted with water to some extent. The resultant aqueous propylene glycol solution 4 having a high glycol concentration is used. The aqueous propylene glycol solution 4 is poured into the adhesive agent poured/mixed solution 3 under stirring, and the adhesive agent poured/mixed solution 3 and propylene glycol are homogeneously mixed with each other.

The reason why the adhesive agent poured/mixed solution 3 is prepared in advance is to lower the concentration of the rubber contained in the rubber latex 1 by means of the adhesive agent 2. In other words, since the volume is increased by the pour of the adhesive agent 2, the ratio (concentration) of the rubber in the adhesive agent poured/mixed solution 3 becomes lower as compared with the ratio of the rubber in the rubber latex 1.

This fall in the rubber concentration causes the dispersed and floated rubber particles to be away from each other. Therefore, the rubber particles can be prevented from contacting each other and adhering to each other. Furthermore, when the antifreezing agent is poured, it can be relieved that this antifreezing agent irritates the rubber particles.

Propylene glycol has a nature that it is mixed with the rubber latex 1 with more difficulty than ethylene glycol or the like, which is generally known as an antifreezing agent. Therefore, when propylene glycol is incorporated, at a high concentration, into the antifreezing agent or when the pouring speed thereof is large, propylene glycol which has not yet been blended irritates the rubber particles so that rubber aggregation lumps trends to be generated. For this reason, in the present example, propylene glycol is made to the aqueous solution 4, and is poured and mixed in the state that it is easily mixed with the rubber latex 1.

The aggregation of the rubber particles can be suppressed and the generation of the rubber aggregation lumps can be effectively suppressed by synergetic effects from the fact that the adhesive agent 2 is beforehand poured/mixed into/with the rubber latex 1 to lower the rubber concentration and the fact that propylene glycol is poured/mixed, in an aqueous solution state, into/with the adhesive agent poured/mixed solution 3, which is a mixed solution of the rubber latex and the adhesive agent.

In this case, the concentration of the aqueous propylene glycol solution is preferably from 92 to 98%. In other words, 92 to 98 parts by weight of propylene glycol is preferably contained in 100 parts by weight of the aqueous solution thereof. If the concentration is less than 92%, it is difficult to make the freezing temperature of the puncture sealing agent sufficiently low. If the concentration is more than 98%, a difficulty in mixing the aqueous solution with the rubber latex cannot be sufficiently overcome. Thus, the aqueous solution irritates the rubber particles so that rubber aggregation lumps are easily generated.

In the antifreezing agent pouring/mixing step S2, it is preferred to control the pouring speed of the aqueous propylene glycol solution 4 in the range of 5 to 20 liters/minute and control the rotation speed in the stirring in the range of 30 to 400 rpm. If the pouring speed is less than 5 liters/minute, too much time becomes necessary so as to result in a drop in production efficiency and a rise in production costs. On the other hand, if the pouring speed is more than 20 liters/minute, the aqueous solution is not sufficiently mixed. If the rotation speed is less than 30 rpm, the aqueous solution is not sufficiently mixed, and if the rotation speed is more than 400 rpm, the aqueous solution irritates the rubber particles. In both the cases, rubber aggregation lumps are generated.

In the adhesive agent pouring/mixing step S1, the pouring method, the pouring speed, the rotation speed in the stirring, and so on are not particularly limited. However, they preferably follow those in the antifreezing agent poured/mixed step S2 in order to suppress the generation of rubber aggregation lumps.

In the case that the puncture sealing agent contains the surfactant, the surfactant is mixed with the rubber latex 1 previous to the antifreezing agent pouring/mixing step S2.

The above has described particularly preferred examples of the present invention in detail. However, the present invention is not limited to these examples, which are illustrated, and may be modified to various examples.

EXAMPLES

A production process according to the present invention and a comparative production process were used to produce 12.5 liters of each of puncture sealing agents A, B and C identified by specifications shown in Table 1. The amounts of rubber aggregation lumps generated at this time were measured, and compared. The low-temperature property, the sealing ability, the storability and other properties of the puncture sealing agents A, B and C were tested. The results were compared with those from a puncture sealing agent, using ethylene glycol, according to the prior art.

(1) Production Process According to the Present Invention

An adhesive agent was poured into a natural rubber latex under stirring so as to prepare an adhesive agent poured/mixed solution. After the end of the pouring, the stirring was continued for 5 minutes. (The pouring speed was 20 liters/minute, and rotation speed in the stirring was 200 rpm.)

An aqueous propylene glycol solution (concentration: 95%, or 90%) was poured into the prepared adhesive agent poured/mixed solution under stirring, to prepare a puncture sealing agent A or B shown in Table 1. After the end of the pouring, the stirring was continued for 10 minutes. (The pouring speed was 15 liters/minute, and rotation speed in the stirring was 200 rpm.)

(2) Comparative Production Process

An adhesive agent was poured into a natural rubber latex under stirring so as to prepare an adhesive agent poured/mixed solution. After the end of the pouring, the stirring was continued for 5 minutes. (The pouring speed was 20 liters/minute, and rotation speed in the stirring was 200 rpm.)

A propylene glycol stock solution (concentration: 100%) was poured into the prepared adhesive agent poured/mixed solution under stirring, to prepare a puncture sealing agent C shown in Table 1. After the end of the pouring, the stirring was continued for 10 minutes. (The pouring speed was 15 liters/minute, and rotation speed in the stirring was 200 rpm.)

(3) Amount of Generated Rubber Aggregation Lumps

The amount of rubber aggregation lumps generated after each puncture sealing agent was prepared is represented as percentage in the whole rubber component.

(4) Low Temperature Property

The freezing temperature of each prepared puncture sealing agent was measured.

(5) Sealing Ability

A hole was made in a tire having a tire size of 185/65R14 with a nail having a diameter of 4.0 mm. After the nail was pulled out, 500 ml of each puncture sealing agent was poured into the hole, and the pressure of air was raised to 200 kPa. Thereafter, the tire was caused to run with a load of 3.5 kN on a drum for 10 minutes. Thereafter, it was evaluated whether or not the puncture hole was closed. A case in which the hole was closed is represented as 0, and a case in which the hole was not closed is represented as $^x$.

(6) Storability

A 500 ml of each prepared puncture sealing agent was put in a container in a bottle form, and the container was stored to stand still in an oven of 80° C. for 2 months. Thereafter, the weight of a generated creamy material was measured. The weight is represented as percentage in the whole rubber component.

TABLE 1

|  | Example A | Example B | Example C | Example according to the prior art |
|---|---|---|---|---|
| Natural rubber latex | 6.25 liters (corresponding to 50% by weight) | 6.25 liters (corresponding to 50% by weight) | 6.25 liters (corresponding to 50% by weight) | 6.25 liters (corresponding to 50% by weight) |
| Rubber solid content | (corresponding to 30% by weight) | (corresponding to 30% by weight) | (corresponding to 30% by weight) | (corresponding to 30% by weight) |
| Adhesive agent | 2.5 liters | 2.5 liters | 2.5 liters | 2.5 liters |
| Terpene resin | (corresponding to 20% by weight) | (corresponding to 20% by weight) | (corresponding to 20% by weight) | (corresponding to 20% by weight) |
| Antifreezing agent | 3.75 liters | 3.75 liters | 3.75 liters | 3.75 liters |
| Propylene glycol (in a liquid state) | (corresponding to 30% by weight) (Aqueous solution (concentration: 95%)) | (corresponding to 30% by weight) (Aqueous solution (concentration: 90%)) | (corresponding to 30% by weight) (Stock solution (concentration: 100%)) | — |
| Ethylene glycol (in a liquid state) | — | — | — | (corresponding to 30% by weight) (Stock solution (concentration: 100%)) |
| Amount of generated rubber aggregation lumps | 0.1% | 0.1% | 5.0% | 0% |
| Low temperature property (freezing temperature) | −38° C. | −35° C. | −40° C. | −40° C. |
| Sealing ability | 0 | 0 | 0 | 0 |
| Storability | 12% | 12% | 12% | 15% |

The following can be verified: the puncture sealing agents A, B and C according to the first aspect of the present invention, wherein propylene glycol was used as an antifreezing agent, had the same level in low temperature property and sealing ability as the product in the prior art; and further the transformation to a creamy material was able to be suppressed when the agents were stored for a long term, and the storability thereof was improved.

It can also be verified that according to the puncture sealing agents A and B produced by the second aspect of the present invention, the generation of rubber aggregation lumps in the production was able to be largely suppressed. Thus, the second aspect of the present invention makes it possible to produce a high-quality puncture sealing agent into which propylene glycol is incorporated at a high concentration.

What is claimed is:

1. A puncture sealing agent composition for a tire, comprising a rubber latex, an adhesive agent, and an antifreezing agent,
   Wherein said antifreezing agent comprises propylene glycol, and further wherein the ratio of the propylene-glycol to the total weight of the puncture sealing agent composition is 20 to 40% by weight.

2. The puncture sealing agent composition according to claim 1, wherein the ratio of the rubber latex to the total weight of the puncture sealing agent composition is 40 to 60% by weight and the ratio of the adhesive agent 10 to 30% by weight.

3. The puncture sealing agent composition according to claim 1, wherein the rubber latex is comprised of a deproteinized natural rubber latex wherein the ratio of nitrogen to rubber solid content is 0.1% or less by weight and the ratio of the rubber solid content to the total weight of the puncture sealing agent composition is 25% or more by weight.

4. A process for producing a puncture sealing agent composition for a tire, comprising a rubber latex, an adhesive agent, and an antifreezing agent, wherein said antifreezing agent comprises propylene glycol, and further wherein the ratio of the propylene glycol to the total weight of the puncture sealing agent composition is 20 to 40% by weight, said process comprising the steps of
   pouring/mixing the adhesive agent into/with the rubber latex under stirring to yield a mixture of the adhesive agent and said latex, and
   pouring/mixing an aqueous propylene glycol solution into/with the mixture of said adhesive agent of said latex under stirring.

5. The process for producing a puncture sealing agent composition for a tire according to claim 4, wherein the aqueous propylene glycol solution comprises 92 to 98 parts by weight of the propylene glycol per 100 parts by weight of the aqueous solution.

6. The process for producing a puncture sealing agent composition for a tire according to claim 4, said step of pouring the aqueous propylene glycol solution into the mixture of said adhesive agent and said latex under stirring occurs at a pouring speed of 5 to 20 liters per minute and further stirring the aqueous propylene glycol solution at a speed of 30 to 400 rpm.

7. The puncture sealing agent composition according to claim 1, wherein a surfactant selected from the group consisting of ammonium laurate or triethanolamine laurate is present.

* * * * *